United States Patent [19]

Balducci et al.

[11] 4,272,296

[45] Jun. 9, 1981

[54] NEW INORGANIC PIGMENTS AND PROCESS FOR THEIR PREPARATION

[75] Inventors: Luigi Balducci, Alessandria; Massimo Rustioni, Pozzolo Formigaro, both of Italy

[73] Assignee: Montedison S.p.A., Milan, Italy

[21] Appl. No.: 118,117

[22] Filed: Feb. 4, 1980

[30] Foreign Application Priority Data

Feb. 9, 1979 [IT] Italy ............................. 20036 A/79

[51] Int. Cl.³ .............................................. C09C 1/00
[52] U.S. Cl. ................................ 106/288 B; 106/306; 423/593; 423/554
[58] Field of Search ......................... 106/288 B, 306; 423/593, 554

[56] References Cited

U.S. PATENT DOCUMENTS 4,115,142  9/1978  Hess ................................. 106/288 B

FOREIGN PATENT DOCUMENTS 48-29480  9/1973  Japan ...................................... 423/593

Primary Examiner—Helen M. McCarthy
Attorney, Agent, or Firm—Morgan, Finnegan, Pine, Foley & Lee

[57] ABSTRACT

The present invention concerns new inorganic pigments and a process for their preparation. More particularly, it relates to new bismuth vanadate based yellow pigments. The pigments of this invention include orthorhombic barium sulphate as a diluent, said diluent being in an amount comprised between 10 and 90% by weight of the total composition.

9 Claims, No Drawings

NEW INORGANIC PIGMENTS AND PROCESS FOR THEIR PREPARATION

BACKGROUND OF INVENTION

The most widely used yellow pigments are: chromium yellows, cadmium yellows and cadmiopone yellows. Since they contain lead and hexavalent chromium or cadmium, these traditional pigments are suspected of being toxic.

There are alternative pigments of the same colour based on nickel titanates $TiO_2$—$NiO$—$Sb_2O_3$, which do not have, however, properties comparable with those of the aforementioned pigments as far as colour saturation and tinting strength are concerned.

It has also been suggested to use bismuth vanadate $BiVO_4$ with a monoclinic crystalline structure, as an alternative pigment. As a matter of fact, said product possesses optical and pigmentary properties similar to those of "primerose" chromium yellow. However, its cost is too high considering the high price of the raw materials used for its preparation, which are vanadium and bismuth compounds.

U.S. Pat. No. 4,026,722 has suggested the use of bismuth vanadate based pigments, diluted with $SiO_2$ and $Al_2O_3$, in which the content in $BiVO_4$ may be reduced down to 44% by weight. With respect to pure bismuth vanadate (and this also with respect to the traditional yellow pigments) these pigments show, however, a lowering of the colour saturation and especially a considerable drop in hiding power and tinting strength.

OBJECTS OF THE INVENTION

One of the objects of this invention is to provide new yellow pigments that are free of lead, chromium and cadmium and that will show optical and pigmentary properties similar to those of the traditional yellow pigments.

Another object of this invention is to provide a range of new pigments whose optical and pigmentary characteristics may vary within certain limits, wherefore some of them will have characteristics similar to cadmium yellows, others to chromium yellows and others still to cadmiopone yellows.

A further object of the invention is that of providing new pigments based on bismuth vanadate and a diluent, which will allow to use even lesser quantities of $BiVO_4$ than those illustrated by the prior art, while at the same time obtaining products endowed with excellent optical and pigmentary properties.

Still further object of this invention is to provide a process for preparing the above cited pigments.

SUMMARY OF THE INVENTION

New yellow pigments based on monoclinic bismuth vanadate and a diluent, characterized in that the diluent is orthorhombic barium sulphate, present in quantities comprised between 10 and 90% by weight of the total composition.

GENERAL DESCRIPTION OF INVENTION

It has been found that the objects of this invention may be realized by providing new yellow pigments based on bismuth vanadate and a diluent according to this invention, and in which the diluent consists of orthorhombic barium sulphate, present in quantities comprised between 10% and 90% by weight (referred to the total weight of the pigment).

In fact, it has been found that the presence of $BaSO_4$, within certain limits of concentration by weight, allows one to obtain pigments with optical properties (colour saturation and reflectances on green, amber red and blue filters) and with pigmentary properties (tinting strength and hiding power) absolutely comparable with those of the traditional yellow pigments.

By increasing the quantity of $BaSO_4$, the tinting strength and the hiding power will decrease. By varying the quantity of $BaSO_4$, it is thus possible to obtain products that will be comparable, as far as these properties are concerned, with respectively the light cadmium yellows (using about 30% of $BaSO_4$), with the "primerose" chromium yellows (using about 50% of $BaSO_4$) and with the cadmiopone yellows (using about 70% of $BaSO_4$).

When increasing the quantity of $BaSO_4$, there also decreases the colour saturation, while there increases, however, contemporaneously, the economical convenience of the products.

As already explained, the quantity of $BaSO_4$ may vary from 10% to 90% by weight. These products may thus be represented by the formula: $BiVO_4.xBaSO_4$ wherein x (expressed as a molar ratio) varies from 0.15 to 12.5.

These products have a colour saturation (P%) of at least 60% and a reflectance on green ($R_V$%) of at least 60%. These minimum values are obviously referred to the products with the highest content in $BaSO_4$.

Preferred products are those containing between 30% and 70% of $BaSO_4$; in the formula $BiVO_4.xBaSO_4$, x varies from 0.59 to 3.24. In this range of products will be found those having optical and pigmentary properties similar to those of cadmium yellows, "primerose" chromium yellows and cadmiopone yellows. These products have a colour saturation P% of at least 70% and a reflectance on green $R_V$% of at least 70%.

The products that are most widely preferred are those containing 30% to 50% of $BaSO_4$; in the formula: $BiVO_4$, x varies from 0.59 to 1.4. These are the products having the higher optical and pigmentary properties: in fact their properties are of the same level as those of the best traditional yellow pigments, that is, of cadmium yellows and chromium yellows, while they are superior to those of the cadmiopone yellows. These products have a colour saturation P% of at least 75% and a reflectance on green $R_V$% of at least 75%. In the best products the colour saturation attains about 80% while the reflectance on green amounts to about 80%.

In the products according to the invention, which have less than 30% by weight of $BaSO_4$, the colour saturation and reflectance on green tend to increase further, as also do the pigmentary properties. However, it is preferred to use at least 30% of $BaSO_4$ in order to contain the price of the product.

In the products according to the invention, which have more than 70% of $BaSO_4$, the optical and pigmentary properties are lower than those of the preferred products; however, these properties on the whole are not inferior to those of the nickel titanates. In fact, their tinting strength and their colour saturation are superior to those of these latter pigments, while their hiding power is inferior.

The pigments according to this invention, have usually a dominant wave length $\lambda_D$ comprised between 573 and 576 nm. They generally have a specific surface comprised between 2 and 15 sq. mt/g.

Their tinting strength is determined by making a film of paint made of one part of coloured pigment with 3 parts of $TiO_2$ and 3 parts of vehicle, and by then measuring the percentual ratio between the colour saturation of the dilute tone and that of the mass-tone, as described in Example 1.

The preferred products, containing from 30 to 70% of $BaSO_4$, having a tinting strength, expressed by the above said percentual saturation ratio, of at least 50%. The most preferred ones, containing from 30% to 50% of $BaSO_4$, having a tinting strength of at least 60%; in certain products the tinting strength attains about 70%.

Their hiding power has been determined through the contrast ratio on green, amber red and blue filters on a film of dry paint, 50μ thick, spread on Morest cardboards, just as described in Example 1. The preferred products, containing from 30 to 70% of $BaSO_4$, have a contrast ratio $R_C$ on green of at least 0.740, on amber of at least 0.680 and on blue of at least 0.950. The most preferred ones, containing from 30 to 50% of $BaSO_4$ have a $R_C$ on green of at least 0.880, on amber of at least 0.850 and on blue of at least 0.970; in some cases $R_C$ attains 0.950 on green, 0.930 on amber and 0.990 on blue.

The pigments of this invention may be prepared according to the following process:

A solution of bismuth nitrate and barium nitrate in acetic acid is prepared, said solution having a pH comprised between 0.5 and 1.5. Separately there is prepared an alkaline solution containing both a sulphate of an alkaline metal or of ammonium, as well as an orthovanadate $VO_4$ or a metavanadate $VO_3-$ of an alkaline metal or of ammonium. Thereupon the second solution is admixed to the first solution with the consequential precipitation of $BaSO_4$ and $BiVO_4$. The precipitate is thereupon separated from the mother liquor and washed with water, in order to remove the soluble salts. It is then calcined in the presence of air at a temperature comprised between 400° and 700° C., and then the calcined product is slowly cooled down and finally ground.

It has been found that the presence of $CH_3CO_2H$ in the solution of $Bi(NO_3)_3$ and $Ba(NO_3)_2$ and the conferring to that solution of a pH comprised between 0.5 and 1.5, are important conditions for obtaining a good pigment.

When the pH turns out to be too low, it will be corrected with the addition of an alkaline hydroxide (in general NaOH) or of $NH_3$. Best products are obtained in general when the pH is comprised between 1.0 and 1.5. The total concentration in mols of $Bi(NO_3)_3$ and $Ba(NO_3)_2$ in general is comprised between 0.15 and 0.3 mols per liter of acid solution. The molar ratio $Bi(NO_3)_3/CH_3CO_2H$ in general is comprised between 0.02 and 0.1.

The molar ratio $Ba(NO_3)_2/Bi(NO_3)_3$ depends, obviously, on the content in $BaSO_4$ that one wishes to obtain in the pigment.

The alkaline solution of vanadate and sulphate in general has a pH comprised between 7 and 10, but preferably comprised between 8 and 9. If its pH were to turn out to be too high, it may be corrected with $HNO_3$ or $H_2SO_4$: in this latter case, care must be taken to respect the stoichiometric ratio between the $Ba^{++}$ ions of the acid solution and the $SO_4^{=}$ ions of the alkaline solution.

As starting vanadium compounds there may be used in particular $NaVO_3$, $NH_4VO_3$, $Na_3VO_4$ and $V_2O_5$ dissolved in NaOH. As sulphates there may be used in particular $Na_2SO_4$, $(NH_4)_2SO_4$ and $K_2SO_4$, as well as $H_2SO_4$, correcting, when necessary, the pH with an alkaline hydroxide or with $NH_3$.

In general the total concentration of vanadate and sulphate is comprised between 0.15 and 0.40 mols per liter of solution, but preferably is comprised between 0.20 and 0.35.

The quantities of reactants present in the two solutions in general are such as to respect the stoichiometry of the reaction:

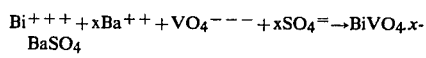

$$Bi^{+++} + xBa^{++} + VO_4^{---} + xSO_4^{=} \rightarrow BiVO_4 \cdot xBaSO_4$$

However, it has been found that with small variations with respect to the stoichiometry, there are still obtained good products, provided that both the molar ratio $Bi^{+++}/VO_4^{---}$ and that of $Ba^{++}/SO_4^{=}$ be comprised between about 0.99 and about 1.01.

The alkaline solution is then admixed under mechanical stirring to the acid solution whereupon there occurs the double exchange reaction and the co-precipitation of the $BiVO_4$ and the $BaSO_4$. The precipitation temperature of the pigment in general is comprised between 15° and 40° C., but preferably one operates at temperatures comprised between 15° and 25° C.

The precipitation time varies in general from 5 minutes to 1 hour but, more commonly, between 15 and 30 minutes.

At the end of the precipitation, the pigment slurry is maintained under stirring, for instance for times comprised between 15 minutes and 1 hour. The final pH will vary from 0.8 to 3.0, depending on the pH of the precipitating solutions.

Operating under the preferred conditions, the final pH will be comprised between 2.0 and 3.0.

The product, separated from the mother liquor, is then washed with water in order to remove the soluble salts, and is then submitted to the calcining treatment. This treatment may be carried out either on the product in the pasty state, that is, on the filtration cake, or on the product previously dried (for instance at 100°–130° C.).

The calcining is carried out in the presence of air at temperatures comprised between 400° and 700° C.; the duration of the operation in general is comprised between 30 minutes and 3 hours, but preferably between 1 and 2 hours.

One may operate under static conditions but preferably a rotary oven is used in order to ensure a greater uniformity of the temperature inside the mass of the product.

Preferably, calcination is carried out at temperatures comprised between 500° and 600° C. Under such conditions one obtains products with a dominant wave length comprised between 573 and 576 mm, and endowed with excellent optical and pigmentary properties.

At temperatures exceeding 600° C., the mass-tones are slightly more yellow or more orange-coloured and the tinting strength and hiding power are inferior. At temperatures lower than 500° C., the dominant wave length shifts towards values that are lower than those of chromium, cadmium and cadmiopone yellows, while the pigmentary properties remain good.

In order to obtain good products, it is necessary to cool the calcining product down slowly: for instance, it will be brought to temperatures comprised between 200° C. and room temperature in a time comprised between 2 and 24 hours.

Successively the products will be discharged from the oven and, when necessary, cooled down up to room temperature, whereafter they are subjected to grinding which will preferably be carried out in the wet state, for instance, in either a ball mill, a microsphere mill or a sand mill.

When the product is wet ground, it will then be dried, for instance, at 100°–110° C. Thereafter it is subjected to to a further dry grinding, for instance in an automatic mortar.

SPECIFIC DESCRIPTION OF THE INVENTION

The following examples are given for illustrative purposes for further clarifying the inventive idea.

EXAMPLE 1

0.077 mols of $Bi(NO_3)_3.5H_2O$ were dissolved in 100 cc of 96% acetic acid. To this solution were then admixed 0.107 mols of $Ba(NO_3)_2$ and the whole was then diluted with water to make 1000 ml. The solution was maintained under mechanical stirring until attaining complete dissolution of the salt whereupon there was added a solution of 2 N NaOH so that the pH of the solution was equal to 1.

Separately, 0.077 mols of $NaVO_3$ and 0.107 mols of $Na_2SO_4$ were dissolved in 700 ml of $H_2O$ and the pH of the solution was corrected to 8.5 by the addition of 2 N NaOH. The temperature of the solution amounted to 25° C.

Into a 2.5 lt beaker, fitted with a mechanical stirrer, into the solution containing bismuth and barium nitrates was dripped in 30 minutes the vanadate-sodium sulphate solution. At the end of the addition, the pH of the slurry amounted to about 1.5

The precipitate was kept under stirring for 30 minutes at a temperature of 25° C., after which the product was allowed to decant and the mother liquor was discharged. The product was then washed with water in order to remove the soluble salts. Thereafter the product was filtered, dried at 100°–110° C. and calcined in a muffle stove at a temperature of 550° C. for 1 hour. At the end of the calcining the product was cooled down to room temperature in about 20 hours and was then wet ground according to the following procedures:

into a 80 ml container were introduced 35 g of small glass balls (having a diameter of 2 mm), 15 g of pigment and 30 ml of water. The container was then sealed and placed on a "Red Devil" vibrating stirrer where the product was ground for 20 minutes.

At the end the product was separated from the grinding elements, was filtered, dried at 100° C. and finally ground in an automatic laboratory mortar of the "Pulverisette" type, for 5 minutes.

The pigment thus obtained, analyzed by X-Rays, proved to consist of monocline bismuth vanadate (card ASTM 14-688) and of orthorhombic barium sulphate (card ASTM 24-1035). It shows a mean granulometry of about 0.2μ and a specific surface of 7.2 sq. mt/g.

The product contained 50% by weight of $BaSO_4$, corresponding to formula $BiVO_4.1,388 BaSO_4$.

For comparative purposes, there was prepared a bismuth vanadate diluted with $SiO_2$ and $Al_2O_3$, following the procedures indicated in example 1 of U.S. Pat. No. 4,026,722.

For this purpose 5.14 g of $Bi_2O_3$, 2.58 g of $NH_4VO_3$, 4.5 g of $\alpha$-$Al_2O_3$ and 0.5 g of $SiO_2$ were intimely dry-mixed together in an automatic mortar of the "Pulverisette" type.

The mixture was then placed into a porcelain crucible and calcined for 0.5 hours at 900° C. The product was successively crushed and homogenized in the automatic mortar after which it was again calcined for 1 hour at 1100° C. and successively wet ground for 15 minutes, following the operational conditions described hereinabove. The product was then dried and dry-ground, still as described herein above. The product thus obtained contained 58.9% by weight of $BiVO_4$, that is a quantity greater than that of the product (50%) prepared according to this invention.

The colorimetric characteristics of the two products were determined on a film of dry paint 50μ thick, obtained by dispersing in a Hoover-type mixer two parts of pigment in one part of vehicle of the following composition:

| | |
|---|---|
| Aroplaz 1279 (alkydic resin 68% by weight: soya oil 32%) | 76.3% |
| FL 30 (boiled linseed oil) | 19.0% |
| Drying mixture | 4.7% |
| The drying mixture was of the following composition: | |
| Ca-naphtenate | 1.77% |
| Zr-naphtenate | 5.31% |
| Co-naphtenate | 6.90% |
| white spirit | 86.02% |

The colorimetric measures were carried out by means of a differential tristimulus colorimeter Model Ducolor 220 by the Neotec Instruments Corp. Said apparatus gives the values of tristimuli X, Y and Z, and the reflactances R, R and $R_B$ respectively on a green, amber and blue filter, with reference to a calibrated standard with respect to Mg oxide (standard S/N 22 197 by Neotec Corporation with $R_V$=92.0, $R_A$=92.0 and $R_B$=88.6).

From the tristimuli values X, Y, Z supplied by the apparatus, have been determined the trichromatic coordinates (x, y) and, by means of a graph, there were drawn the values of the dominant wave length ($\lambda_D$) and of the colour saturation (P%).

The values thus found have been recorded on Table A, in which there have also been inserted, for comparative purposes, the values relative to two commercial yellow pigments: a "primerose" chromium yellow and a light cadmium yellow.

For the determination of the tinting strengths, there were blended together one part of coloured pigment with three parts of $TiO_2$ and three parts of the vehicle described previously. The tinting strength was evaluated through the percentual ratio between saturation (P%) of the dilute tone and that of the mass-tone. The higher said value, the higher the tinting strength of the product. The values found have likewise been recorded on Table A.

The hiding power of the pigments has been evaluated both by simple visual comparison of the paint of the pigment under examination with the paint of the reference pigment, as well as by measuring the contrast ratio on the usual three filters.

Said measurements were carried out on thin films of dry paint, 50μ thick, spread on Morest cardboards; the paints had been prepared according to the following procedures:

10 grams of pigment were additioned with 35 g of small glass balls of about 2 mm diameter, and with 15 g of a vehicle of the following composition:

| | |
|---|---|
| 50% Resial 3118 (consisting of 55% linseed oil), 29% phtalic anhydride, 16% of pentaerythriol and glycols) and 50% white spirit | 70.60% b.w. |
| xylol | 14.70% b.w. |
| white spirit | 14.70% b.w. |

These mixtures were placed into 80 ml glass containers. The containers were then sealed and placed into a "Red Devil" vibrating mixer, for 1 hour. Thereafter there were added further 24 g of a mixture consisting of 70% Resial 5132 (Soja oil 65%, phtalic anhydride 20%, pentaerythritol 15%) with 30% of white spirit.

After an accurate homogenization, the paint was subjected to treatment on the vibrating mixer for 5 minutes. The pigment thus dispersed in the vehicle was separated from the small glass balls and then additioned with further 3% by weight of a drying mixture of the following ponderal composition:

| | |
|---|---|
| Ca-naphtenate | 1.77% |
| Zr-naphtenate | 5.31% |
| Co-naphtenate | 6.90% |
| White spirit | 86.02% |

The contrast ratios, determined by colorimetric measurements carried out on a differential tristimulus colorimeter, model Ducolor 220, built by Neotec Instrument Corp., have been recorded on Table A.

TABLE A

| Nature of product | REFLECTANCE | | | $\lambda_D$ | Color Saturation P % | Tinting strength percentual saturation ratio | Hiding power Percentual contrast ratios: | | |
|---|---|---|---|---|---|---|---|---|---|
| | $R_V$ | $R_A$ | $R_B$ | | | | $R_C$ green | $R_C$ amber | $R_C$ blue |
| Product of example 1 BiVO$_4$ diluted with SiO$_2$ and Al$_2$O$_3$ | 80.7 | 89.4 | 13.7 | 573.6 | 75.0 | 65.3 | 0.904 | 0.868 | 0.986 |
| | 68.9 | 74.9 | 12.6 | 574.7 | 67.3 | 52.4 | 0.622 | 0.571 | 0.874 |
| "primerose" chromium yellow | 77.6 | 87.8 | 10.3 | 574.6 | 80.8 | 60.1 | 0.842 | 0.798 | 0.972 |
| light cadmium yellow | 78.3 | 87.8 | 10.5 | 573.4 | 78.5 | 70.6 | 0.938 | 0.910 | 0.989 |

TABLE B

| Example No | COMPOSITION | Calcination temperature | REFLECTANCES | | | $\lambda_D$ | Colour saturation P % | Tinting strength percentual saturation ratio |
|---|---|---|---|---|---|---|---|---|
| | | | $R_V$ | $R_A$ | $R_B$ | | | |
| 2 | 50% BaSO$_4$ | 500° C. | 82.0 | 89.8 | 15.0 | 573.3 | 72.8 | 66.8 |
| 3 | 50% BaSO$_4$ | 550° C. | 80.7 | 89.4 | 13.7 | 573.6 | 75.0 | 65.3 |
| 4 | 50% BaSO$_4$ | 600° C. | 80.3 | 90.3 | 12.5 | 574.2 | 76.8 | 64.1 |
| 5 | 30% BaSO$_4$ | 500° C. | 78.6 | 88.7 | 12.2 | 574.4 | 76.9 | 69.2 |
| 6 | 30% BaSO$_4$ | 600° C. | 74.4 | 86.6 | 9.4 | 575.5 | 81.0 | 58.3 |

TABLE C

| Example No | COMPOSITION | Acid solution molar concentration | Acid solution pH | Alkaline solution molar concentration | Alkaline solution pH | precipitation time (minutes) | final pH | Calcining temperature °C | $\lambda_D$ | Reflectance $R_V$ | Color saturation P % | Hiding Power $R_C$ green | Hiding Power $R_C$ amber | Hiding Power $R_C$ blue | Tinting strength: percentual saturation ratio |
|---|---|---|---|---|---|---|---|---|---|---|---|---|---|---|---|
| 7 | 30% BaSO₄ | 0.22 | 0.8 | 0.22 | 8.0 | 20 | 2.1 | 600 | 575.2 | 75.7 | 80.2 | 0.886 | 0.857 | 0.969 | 60.8 |
| 8 | 30% BaSO₄ | 0.22 | 0.8 | 0.32 | 8.0 | 40 | 2.0 | 500 | 574.2 | 80.0 | 76.0 | 0.952 | 0.928 | 0.985 | 68.8 |
| 9 | 30% BaSO₄ | 0.16 | 1.3 | 0.22 | 8.0 | 40 | 2.9 | 500 | 574.0 | 80.6 | 76.9 | 0.950 | 0.928 | 0.992 | 69.6 |
| 10 | 30% BaSO₄ | 0.22 | 1.3 | 0.22 | 9.0 | 20 | 2.8 | 500 | 574.7 | 77.0 | 77.2 | 0.953 | 0.931 | 0.992 | 68.9 |
| 11 | 30% BaSO₄ | 0.22 | 1.3 | 0.32 | 9.0 | 40 | 2.7 | 600 | 575.7 | 75.1 | 80.0 | 0.943 | 0.919 | 1.000 | 61.2 |
| 12 | 30% BaSO₄ | 0.22 | 1.3 | 0.22 | 8.0 | 40 | 2.2 | 500 | 573.4 | 78.0 | 71.3 | 0.747 | 0.680 | 0.956 | 58.9 |
| 13 | 70% BaSO₄ | 0.22 | 1.3 | 0.22 | 8.0 | 20 | 2.3 | 600 | 574.4 | 77.0 | 75.2 | 0.823 | 0.773 | 0.968 | 58.0 |
| 14 | 70% BaSO₄ | 0.16 | 1.3 | 0.22 | 9.0 | 40 | 2.4 | 600 | 574.7 | 75.3 | 74.0 | 0.785 | 0.726 | 0.963 | 57.8 |
| 15 | 50% BaSO₄ | 0.20 | 1.3 | 0.29 | 8.6 | 20 | 2.5 | 700 | 576.2 | 68.0 | 83.0 | 0.729 | 0.691 | 0.923 | 37.3 |
| 16 | 50% BaSO₄ | 0.20 | 1.3 | 0.29 | 8.6 | 30 | 2.5 | 400 | 573.5 | 76.8 | 71.2 | 0.824 | 0.765 | 0.981 | 69.1 |
| 17 | 50% BaSO₄ | 0.20 | 1.3 | 0.29 | 8.6 | 30 | 2.5 | 510 | 573.5 | 81.7 | 75.0 | 0.892 | 0.856 | 0.979 | 68.0 |
| 18 | 65% BaSO₄ | 0.22 | 1.5 | 0.32 | 8.7 | 30 | 2.0 | 460 | 573.4 | 78.9 | 72.3 | 0.780 | 0.719 | 0.961 | 63.0 |
| 19 | 80% BaSO₄ | 0.27 | 0.8 | 0.40 | 8.9 | 20 | 2.2 | 500 | 573.0 | 70.7 | 65.0 | 0.743 | 0.682 | 0.948 | 50.0 |
| Nickel titanate | // | // | // | // | // | // | // | // | 572.5 | 74.9 | 55.2 | 0.890 | 0.878 | 0.984 | 38.4 |
| Light cadmium yellow | // | // | // | // | // | // | // | // | 573.4 | 78.3 | 78.5 | 0.938 | 0.910 | 0.989 | 70.6 |
| "primerose" chromium yellow | // | // | // | // | // | // | // | // | 574.6 | 77.6 | 80.8 | 0.842 | 0.798 | 0.972 | 60.1 |
| Cadmiopone yellow | // | // | // | // | // | // | // | // | 574.5 | 71.4 | 81.2 | 0.773 | 0.710 | 0.953 | 57.4 |

Comparing the results reported by Table A, one will notice that all the properties of the product prepared according to this invention are by far superior to those of BiVO₄ diluted with SiO₂ and Al₂O₃ in spite of the fact that this latter has a greater content in BiVO₄.

The pigment according to the invention displays properties comparable with those of the two commercial pigments.

EXAMPLES 2-6

There were followed the same procedures as indicated in example 1, except that there was varied the content in BaSO₄ of the pigment and the calcining temperature.

The composition of the pigments, the calcining temperature, the optical properties and the tinting strength have been recorded in Table B.

Example 3 coincides with example 1 herein above-described.

EXAMPLES 7-19

In the following series of examples were varied:
the content in BaSO₄ of the pigment,
the molar concentration in cations of the acid solution ($Bi^{+++}+Ba^{++}$) and the concentration in anions of the alkaline solution ($VO_4^{=}+SO_4^{=}$), as well as the pH of said solutions,
the precipitation time,
the final pH
the calcining temperature.
The other procedures are the same as those of example 1.

In Table C have been recorded the above cited operational conditions and the main characteristics of the pigments: i.e. the $\lambda_D$, the reflectance on gree ($R_V$), the colour saturation P%, the hiding power and the tinting strength.

The table reports also the same characteristics for 4 commercial pigments: a nickel titanate, a light cadmium yellow, a "primerose" chromium yellow and a cadmiopone yellow.

Comparing the results reported by the Table, it will be noticed that the product having 30% of BaSO₄ (examples from 7 to 11) have a hiding power in general higher than that of the light cadmium yellow and at any rate always better than that of the "primerose" chromium yellow and cadmiopone yellow. The tinting strength of the products of examples 8, 9 and 10 is comparable with that of the light cadmium yellow, while for that of examples 7 and 11 the comparison proved more significant with "primerose" chromium yellow. In all cases the tinting strength is greater than that of the cadmiopone yellow.

The products having 70% of BaSO₄ (examples 12–14) usually have a hiding power and a tinting strength still greater than that of the cadmiopone yellow.

A product containing 80% of BaSO₄ (example 19) has still a colour saturation and a tinting strength that are superior to those of nickel titanate; however, its hiding power is inferior.

EXAMPLES 20-22

Following the same procedures as those indicated in Example 1, except that calcining is carried out at 600° C., there was varied the nature of the starting vanadate, preparing in each case a pigment containing 50% of BaSO₄. The nature of the vanadium compound and the optical properties of the products thus obtained, have been recorded on Table D.

TABLE D

| Ex. N. | Vanadium compound | Reflectances | | | $\lambda_D$ | Color Saturation P % |
|---|---|---|---|---|---|---|
| | | $R_V$ | $R_A$ | $R_B$ | | |
| 20 | NH₄VO₃ | 81.6 | 90.7 | 12.7 | 573.8 | 76.6 |
| 21 | Na₃VO₄ | 81.9 | 90.3 | 13.1 | 573.4 | 75.9 |
| 22 | NaVO₃ | 80.3 | 90.3 | 12.5 | 574.2 | 76.8 |

What is claimed is:

1. A yellow pigment composition consisting essentially of monoclinic bismuth vanadate and orthorhombic barium sulfate, in which the barium sulfate is present in amounts between 10 and 90% by weight of the total composition, said composition being obtained by coprecipitating bismuth vanadate and barium sulfate, calcining in the presence of air at a temperature between 400° and 700° C., cooling down slowly and finally grinding.

2. A composition according to claim 1, characterized by a color saturation of at least 60% and a reflectance on green of at least 60%.

3. A composition according to claim 1, which contains from 30 to 70% of barium sulfate.

4. A composition according to claim 3, characterized by a color saturation of at least 70% and a reflectance on green at least equal to 70%.

5. Process for preparing a yellow pigment according to claims 1, 2, 3 or 4 characterized in that a bismuth nitrate and barium nitrate first solution in acetic acid is prepared, said first solution having a pH in the range of 0.5 and 1.5; that a second solution which is an alkaline solution is prepared, containing (1) a first component selected from the group consisting of alkaline metal sulphate and ammonium sulphate and (2) a second component selected from the group consisting of alkaline metal orthovanadates, ammonium orthovanadate, alkaline metal metavanadates and ammonium metavanadate; that the second solution is then admixed to the first solution with the consequential precipitation of BaSO₄ and BiVO₄; that the precipitate is then separated and washed with water in order to remove the soluble salts; that the washed precipitate is then calcined in the presence of air at temperatures comprised between 400° and 700° C.; that the calcination product is then slowly cooled down and finally ground.

6. Process according to claim 5 characterized in that the product is calcined at temperatures comprised between 500° and 600° C.

7. Process according to either claim 5 or 6, characterized in that the pH of the solution of bismuth nitrate and barium nitrate in acetic acid is in the range of 1 and 1.5

8. Process according to one or more of the claims from 5, 6 or 7 characterized in that the precipitation temperature is in the range of 15° and 40° C.

9. Process according to one or more of the claims from 5, 6, 7 or 8 characterized in that the grinding of the calcination product is carried out in the wet method.

* * * * *